(12) United States Patent
Albert et al.

(10) Patent No.: US 11,738,530 B2
(45) Date of Patent: Aug. 29, 2023

(54) METHODS FOR MANUFACTURING WIND TURBINE ROTOR BLADE COMPONENTS

(71) Applicant: General Electric Company, Schenectady, NY (US)

(72) Inventors: Bensely Albert, Greenville, SC (US); Nicholas K. Althoff, La Crosse, WI (US); Stephen Bertram Johnson, New Castle, NH (US)

(73) Assignee: General Electric Company, Schenectady, NY (US)

( * ) Notice: Subject to any disclaimer, the term of this patent is extended or adjusted under 35 U.S.C. 154(b) by 502 days.

(21) Appl. No.: 15/928,254

(22) Filed: Mar. 22, 2018

(65) Prior Publication Data
US 2019/0291372 A1    Sep. 26, 2019

(51) Int. Cl.
*B29D 99/00* (2010.01)
*B29C 51/08* (2006.01)
(Continued)

(52) U.S. Cl.
CPC .......... *B29D 99/0025* (2013.01); *B29C 51/08* (2013.01); *B29C 51/12* (2013.01); *B29C 51/421* (2013.01); *B29C 51/44* (2013.01); *B29C 65/08* (2013.01); *B29C 65/7841* (2013.01); *B29C 66/472* (2013.01); *B29C 66/721* (2013.01); *B29C 66/723* (2013.01); *B29C 70/48* (2013.01); *B29C 70/504* (2013.01); *F03D 1/0675* (2013.01); *B29K 2101/10* (2013.01);
(Continued)

(58) Field of Classification Search
CPC ... B29D 99/0025; B29C 51/08; B29C 70/388; B29C 70/386; B29C 53/04
See application file for complete search history.

(56) References Cited

U.S. PATENT DOCUMENTS

| 1,415,620 A |   | 5/1922 | Albrecht |           |
|-------------|---|--------|----------|-----------|
| 2,254,629 A | * | 9/1941 | Stine    | B21H 7/16 |
|             |   |        |          | 72/364    |

(Continued)

FOREIGN PATENT DOCUMENTS

| CN | 2670606 Y   | 1/2005 |
| CN | 102022288 A | 4/2011 |

(Continued)

OTHER PUBLICATIONS

Machine translation EP1916090A1 (Year: 2008).*

(Continued)

*Primary Examiner* — Matthew J Daniels
*Assistant Examiner* — Wayne K. Swier
(74) *Attorney, Agent, or Firm* — Dority & Manning, P.A.

(57) ABSTRACT

A method for manufacturing a rotor blade component of a rotor blade includes feeding a flat sheet of material into a thermoforming system, wherein the material comprises at least one of a thermoplastic or thermoset material. The method also includes heating the flat sheet of material via the thermoforming system. Further, the method includes shaping the heated flat sheet of material via at least one roller of the thermoforming system into a desired curved shape. Moreover, the method includes dispensing the shaped sheet of material from the thermoforming system. In addition, the method includes cooling the shaped sheet of material to form the rotor blade component.

19 Claims, 11 Drawing Sheets

(51) Int. Cl.

| | | |
|---|---|---|
| *B29C 51/42* | (2006.01) | |
| *B29C 51/44* | (2006.01) | |
| *B29C 65/78* | (2006.01) | |
| *B29C 70/48* | (2006.01) | |
| *B29C 65/08* | (2006.01) | |
| *B29C 65/00* | (2006.01) | |
| *B29C 51/12* | (2006.01) | |
| *F03D 1/06* | (2006.01) | |
| *B29C 70/50* | (2006.01) | |
| *B29K 105/00* | (2006.01) | |
| *B29K 101/10* | (2006.01) | |
| *B29K 101/12* | (2006.01) | |
| *B29L 31/08* | (2006.01) | |

(52) U.S. Cl.
CPC .... *B29K 2101/12* (2013.01); *B29K 2105/256* (2013.01); *B29L 2031/085* (2013.01); *F05B 2230/40* (2013.01); *F05B 2230/50* (2013.01); *F05B 2240/30* (2013.01); *F05B 2280/6003* (2013.01)

(56) References Cited

U.S. PATENT DOCUMENTS

| | | | |
|---|---|---|---|
| 2,566,152 A * | 8/1951 | Wright | B29C 53/063 156/390 |
| 4,264,278 A | 4/1981 | Weingart | |
| 4,475,881 A * | 10/1984 | Borst | B29C 51/262 425/384 |
| 4,883,419 A * | 11/1989 | Queirel | B29C 51/20 425/398 |
| 4,915,590 A | 4/1990 | Eckland et al. | |
| 5,026,447 A | 6/1991 | O'Conner | |
| 5,476,704 A | 12/1995 | Kohler | |
| 5,499,904 A | 3/1996 | Wallace et al. | |
| 5,660,527 A | 8/1997 | Deering et al. | |
| 6,443,701 B1 | 9/2002 | Mühlbauer | |
| 6,701,990 B1 * | 3/2004 | Burley | B29D 99/0003 156/463 |
| 7,037,568 B1 | 5/2006 | Rogers et al. | |
| 7,163,378 B2 | 1/2007 | Kildegaard | |
| 7,198,471 B2 | 4/2007 | Gunneskov et al. | |
| 7,357,726 B2 | 4/2008 | Thorning | |
| 7,438,533 B2 | 10/2008 | Eyb et al. | |
| 7,503,752 B2 | 3/2009 | Gunneskov et al. | |
| 7,517,194 B2 | 4/2009 | Doorenspleet et al. | |
| 7,530,168 B2 | 5/2009 | Sorensen et al. | |
| 7,625,185 B2 | 12/2009 | Wobben | |
| 7,758,313 B2 | 7/2010 | Eyb | |
| 7,942,637 B2 | 5/2011 | Akhtar et al. | |
| 7,963,747 B2 | 6/2011 | Cairo | |
| 7,966,726 B2 | 6/2011 | Schibsbye | |
| 7,988,423 B2 | 8/2011 | Hancock | |
| 8,025,485 B2 | 9/2011 | Jacobsen | |
| 8,043,067 B2 | 10/2011 | Kuroiwa et al. | |
| 8,047,798 B2 | 11/2011 | Bech | |
| 8,066,490 B2 | 11/2011 | Babu et al. | |
| 8,079,818 B2 | 12/2011 | Burchardt et al. | |
| 8,105,040 B2 | 1/2012 | Vronsky et al. | |
| 8,114,329 B2 | 2/2012 | Karem | |
| 8,157,939 B2 | 4/2012 | Stiesdal | |
| 8,168,027 B2 | 5/2012 | Jacobsen et al. | |
| 8,172,538 B2 | 5/2012 | Hancock et al. | |
| 8,186,960 B2 | 5/2012 | Dawson et al. | |
| 8,337,163 B2 | 12/2012 | Nies | |
| 8,348,622 B2 | 1/2013 | Bech | |
| 8,353,674 B2 | 1/2013 | Bech | |
| 8,382,440 B2 | 2/2013 | Baker et al. | |
| 8,506,258 B2 | 8/2013 | Baker et al. | |
| 8,529,717 B2 | 9/2013 | Hedges et al. | |
| 8,540,491 B2 | 9/2013 | Gruhn et al. | |
| 8,545,182 B2 | 10/2013 | Sorenson | |
| 8,545,744 B2 | 10/2013 | Jones | |
| 8,721,829 B2 | 5/2014 | Jacobsen et al. | |
| 8,727,731 B2 | 5/2014 | Bendel et al. | |
| 8,747,098 B1 | 6/2014 | Johnson et al. | |
| 8,777,578 B2 | 7/2014 | Hancock et al. | |
| 8,863,382 B2 | 10/2014 | Piasecki | |
| 9,073,270 B2 | 7/2015 | Bech | |
| 9,180,630 B2 | 11/2015 | Madsen et al. | |
| 9,234,497 B2 | 1/2016 | Grove-Nielsen | |
| 9,327,456 B2 | 5/2016 | Shindo et al. | |
| 9,470,205 B2 | 10/2016 | Liu et al. | |
| 9,500,179 B2 | 11/2016 | Arendt et al. | |
| 9,567,749 B2 | 2/2017 | Hayden et al. | |
| 9,683,545 B2 | 6/2017 | Randall | |
| 9,822,761 B2 | 11/2017 | Merzhaeuser et al. | |
| 10,213,994 B2 | 2/2019 | Tobin et al. | |
| 2004/0140587 A1 | 7/2004 | Hadley | |
| 2005/0056362 A1 * | 3/2005 | Benson | B29C 70/388 156/229 |
| 2005/0269016 A1 | 12/2005 | Oldani et al. | |
| 2006/0175731 A1 | 8/2006 | Bech et al. | |
| 2006/0255486 A1 * | 11/2006 | Benson, Jr. | C08J 5/24 264/1.34 |
| 2007/0140863 A1 | 7/2007 | Eyb et al. | |
| 2007/0160479 A1 | 7/2007 | Livingston et al. | |
| 2007/0189902 A1 | 8/2007 | Mohamed | |
| 2007/0189903 A1 | 8/2007 | Eyb | |
| 2008/0159871 A1 | 7/2008 | Bech | |
| 2008/0181781 A1 | 7/2008 | Livingston et al. | |
| 2008/0206059 A1 | 8/2008 | Hancock et al. | |
| 2009/0068017 A1 | 3/2009 | Rudling | |
| 2009/0175731 A1 | 7/2009 | Burchardt et al. | |
| 2009/0196756 A1 | 8/2009 | Althoff | |
| 2009/0220747 A1 | 9/2009 | Karem | |
| 2010/0084079 A1 | 4/2010 | Hayden et al. | |
| 2010/0290912 A1 | 11/2010 | Sorensen | |
| 2010/0310380 A1 | 12/2010 | Bech | |
| 2011/0031758 A1 | 2/2011 | Mitsuoka et al. | |
| 2011/0037191 A1 | 2/2011 | Stiesdal | |
| 2011/0044817 A1 | 2/2011 | Bendel et al. | |
| 2011/0135485 A1 | 6/2011 | Wang | |
| 2011/0171038 A1 | 7/2011 | Esaki et al. | |
| 2012/0006475 A1 * | 1/2012 | Colombo | B29C 70/388 156/243 |
| 2012/0027609 A1 | 2/2012 | Ogde et al. | |
| 2012/0039720 A1 | 2/2012 | Bech | |
| 2012/0082558 A1 * | 4/2012 | Baker | F03D 1/0675 416/241 R |
| 2012/0183408 A1 | 7/2012 | Noerlem | |
| 2012/0207607 A1 | 8/2012 | Mironov | |
| 2012/0237356 A1 | 9/2012 | Mironov | |
| 2013/0111752 A1 | 5/2013 | Madsen et al. | |
| 2013/0209257 A1 | 8/2013 | Feigl | |
| 2013/0285284 A1 | 10/2013 | Moeller Larsen et al. | |
| 2013/0333823 A1 | 12/2013 | Hedges et al. | |
| 2014/0003956 A1 | 1/2014 | Lull et al. | |
| 2014/0083620 A1 * | 3/2014 | Caffiau | B29C 70/388 156/433 |
| 2014/0140853 A1 | 5/2014 | Feigl | |
| 2014/0154091 A1 | 6/2014 | Baker et al. | |
| 2014/0234109 A1 | 8/2014 | Hayden et al. | |
| 2014/0271198 A1 | 9/2014 | Liu et al. | |
| 2014/0271217 A1 | 9/2014 | Baker | |
| 2014/0301859 A1 | 10/2014 | Hancock et al. | |
| 2015/0023799 A1 | 1/2015 | Wetzel et al. | |
| 2015/0217535 A1 | 8/2015 | Sayyar Bidgoli et al. | |
| 2015/0224721 A1 | 8/2015 | Bendel et al. | |
| 2015/0224759 A1 * | 8/2015 | Boon | F03D 1/0675 156/324 |
| 2015/0224760 A1 | 8/2015 | Eyb et al. | |
| 2015/0316027 A1 | 11/2015 | Sandercock | |
| 2015/0336323 A1 * | 11/2015 | Inada | F04D 29/324 264/320 |
| 2015/0337797 A1 | 11/2015 | Grove-Nielsen | |
| 2015/0354531 A1 | 12/2015 | Kratmann | |
| 2015/0354542 A1 | 12/2015 | Kratmann | |
| 2015/0361950 A1 | 12/2015 | Pipo Benito | |
| 2016/0040651 A1 | 2/2016 | Yarbrough et al. | |
| 2016/0047355 A1 | 2/2016 | Feigl | |
| 2016/0053741 A1 | 2/2016 | Sabbadin | |

(56) References Cited

U.S. PATENT DOCUMENTS

| | | |
|---|---|---|
| 2016/0146184 A1 | 5/2016 | Caruso et al. |
| 2016/0146185 A1 | 5/2016 | Yarbrough et al. |
| 2016/0160837 A1 | 6/2016 | Geiger et al. |
| 2016/0167267 A1 | 6/2016 | Laight |
| 2016/0169195 A1 | 6/2016 | Johnson et al. |
| 2016/0263844 A1 | 9/2016 | Smith |
| 2016/0273516 A1 | 9/2016 | Smith et al. |
| 2016/0281680 A1 | 9/2016 | Randall |
| 2016/0319801 A1 | 11/2016 | Smith |
| 2016/0368230 A1 | 12/2016 | Backhaus et al. |
| 2017/0074241 A1 | 3/2017 | Koike |
| 2017/0080648 A1 * | 3/2017 | Tobin ............... B29C 70/46 |
| 2018/0009155 A1 | 1/2018 | Langeveld et al. |

FOREIGN PATENT DOCUMENTS

| | | | |
|---|---|---|---|
| CN | 102024518 A | 4/2011 | |
| CN | 102024518 B | 4/2011 | |
| CN | 103817952 A | 5/2014 | |
| CN | 104859160 A | 8/2015 | |
| CN | 103921457 B | 3/2016 | |
| CN | 105881936 A | 8/2016 | |
| CN | 105904746 A | 8/2016 | |
| DE | 102011051172 A1 | 12/2012 | |
| DE | 102012219224 B3 | 3/2014 | |
| DE | 102015007289 A1 | 12/2016 | |
| DE | 102015007801 A1 | 12/2016 | |
| DK | 200801457 A | 9/2009 | |
| EP | 1808598 A1 | 7/2007 | |
| EP | 1916090 A1 * | 4/2008 | ........... B29C 53/043 |
| EP | 1956235 A1 | 8/2008 | |
| EP | 2113373 A1 | 11/2009 | |
| EP | 2441571 A1 | 4/2012 | |
| EP | 2181834 B1 | 9/2012 | |
| EP | 2617558 A1 | 7/2013 | |
| EP | 2677170 A1 | 12/2013 | |
| EP | 2682256 A1 | 1/2014 | |
| EP | 2752577 A2 | 7/2014 | |
| EP | 2 939 821 A1 | 11/2015 | |
| EP | 3034865 A1 | 6/2016 | |
| EP | 3281776 A1 | 2/2018 | |
| JP | 2002137307 A | 5/2002 | |
| JP | 2003293935 A | 10/2003 | |
| KR | 101590795 B1 | 2/2016 | |
| NL | 8104019 A | 3/1983 | |
| WO | WO95/02496 | 1/1995 | |
| WO | WO03082551 A1 | 10/2003 | |
| WO | WO2009/085041 A1 | 7/2009 | |
| WO | WO2009/095175 A2 | 8/2009 | |
| WO | WO2009/133143 A1 | 11/2009 | |
| WO | WO2010/083921 A2 | 7/2010 | |
| WO | WO2010/149806 A1 | 12/2010 | |
| WO | WO2011/113812 A1 | 9/2011 | |
| WO | WO2012/140039 A2 | 10/2012 | |
| WO | WO2012/140039 A3 | 10/2012 | |
| WO | WO2012/161741 A2 | 11/2012 | |
| WO | WO2013/087078 A1 | 6/2013 | |
| WO | WO2014/044280 A1 | 3/2014 | |
| WO | WO2014/063944 A1 | 5/2014 | |
| WO | WO2014/079456 A1 | 5/2014 | |
| WO | WO2014/147222 A2 | 9/2014 | |
| WO | WO2015/142904 A1 | 9/2015 | |

OTHER PUBLICATIONS

PCT Search Report and Written Opinion dated Jun. 28, 2019.
U.S. Appl. No. 15/791,705, filed Oct. 24, 2017.
Bundy, Use of Pultruded Carbon Fiber/Epoxy Inserts as Reinforcement in Composite Structures, Thesis for degree of Master of Science in Mechanical Engineering, Montana State University, Dec. 2005, pp. 1-325.
Feng, et al., Mechanical Analysis of Stress Distribution in a Carbon Fiber-Reinforced Polymer Rod Bonding Anchor, Polymers, http://www.mdpi.com/2073-4360/6/4/1129, 2014, vol. 6, pp. 1129-1143.
Mason, Autoclave Quality Outside the Autoclave, CompositesWorld, https://www.compositesworld.com/articles/autoclave-quality-outside-the-autoclave, Mar. 1, 2006, 7 pages.
Marske, Graphlite Carbon Rod, internet web capture from https://www.ihpa.ie/carbon-dragon/index.php/home-top/articles/83-graphlite-carbon-rod, 8 pages.
Van Dijk, Pultrusion Products, DPP: pultrusion rectangular carbon fiber rod/strip, epoxy, 2011, 6 pages.
U.S. Appl. No. 15/399,238, filed Jan. 5, 2017.
U.S. Appl. No. 15/428,568, filed Feb. 13, 2017.
U.S. Appl. No. 15/428,620, filed Feb. 13, 2017.
U.S. Appl. No. 15/628,900, filed Jun. 21, 2017.
U.S. Appl. No. 15/628,933, filed Jun. 21, 2017.
EP Communication pursuant to Article 94(3) for EP application No. 19715637.5, dated Dec. 21, 2022, 4 pages.

* cited by examiner

METHODS FOR MANUFACTURING WIND TURBINE ROTOR BLADE COMPONENTS

FIELD

The present subject matter relates generally to wind turbine rotor blades of and, more particularly, to methods for manufacturing wind turbine rotor blade components using thermoforming and/or pultruded members.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Wind turbine rotor blades generally include a body shell formed by two shell halves of a composite laminate material. The shell halves are generally manufactured using molding processes and then coupled together along the corresponding ends of the rotor blade. In general, the body shell is relatively lightweight and has structural properties (e.g., stiffness, buckling resistance, and strength) which are not configured to withstand the bending moments and other loads exerted on the rotor blade during operation. In addition, wind turbine blades are becoming increasingly longer in order to produce more power. As a result, the blades must be stiffer and thus heavier so as to mitigate loads on the rotor.

To increase the stiffness, buckling resistance, and strength of the rotor blade, the body shell is typically reinforced using one or more structural components (e.g. opposing spar caps with a shear web configured therebetween) that engage the inner surfaces of the shell halves. The spar caps may be constructed of various materials, including but not limited to glass fiber laminate composites and/or carbon fiber laminate composites.

As such, spar caps may also be constructed of pre-fabricated, pre-cured (i.e. pultruded) composites that can be produced in thicker sections, and are less susceptible to defects. In addition, the use of pultrusions in spar caps can decrease the weight and may also increase the strength thereof. Accordingly, the pultruded composites can eliminate various concerns and challenges associated with using dry fabric alone. As used herein, the terms "pultruded composites," "pultrusions," "pultruded members" or similar generally encompass reinforced materials (e.g. fibers or woven or braided strands) that are impregnated with a resin and pulled through a stationary die such that the resin cures or undergoes polymerization through added heat or other curing methods. As such, the process of manufacturing pultruded composites is typically characterized by a continuous process of composite materials that produces composite parts having a constant cross-section. A plurality of pultrusions can then be joined together inside of a casing to form the spar caps and/or various other rotor blade components.

Typical rotor blades have a varying cross-sectional shape from a root end to a tip end. For example, the rotor blade may generally curve or taper along a span defined between the root end and the tip end. As such, the structural components of the body shell may also be required to curve or taper to correspond to the rotor blade shape.

Thus, the art is continuously seeking new and improved methods for manufacturing rotor blade components that accommodate the increasing sizes of rotor blades. Accordingly, the present disclosure is directed to methods for manufacturing rotor blade components using thermoforming and/or pultruded members.

BRIEF DESCRIPTION

Aspects and advantages of the invention will be set forth in part in the following description, or may be obvious from the description, or may be learned through practice of the invention.

In one aspect, the present disclosure is directed to a method for manufacturing a rotor blade component of a rotor blade. The method includes feeding a flat sheet of material into a thermoforming system, wherein the material comprises at least one of a thermoplastic or thermoset material. The method also includes heating the flat sheet of material via the thermoforming system. Further, the method includes shaping the heated flat sheet of material via at least one roller of the thermoforming system into a desired curved shape. Moreover, the method includes dispensing the shaped sheet of material from the thermoforming system. In addition, the method includes cooling the shaped sheet of material to form the rotor blade component.

In one embodiment, the method may include shaping the heated flat sheet of material into a U-shaped receptacle via the at least one roller. In such embodiments, the method may further include placing a plurality of pultruded members (e.g. rods or small plates) into the U-shaped receptacle and securing the plurality of pultruded members within the U-shaped receptacle to form the rotor blade component. For example, in certain embodiments, the plurality of pultruded members may be secured within the U-shaped receptacle via a resin infusion process.

In particular embodiments, the step of placing the plurality of pultruded members into the U-shaped receptacle may include dispensing a layer at a time of the plurality of pultruded members directly from a pultruded member dispensing assembly into the U-shaped receptacle and stacking subsequent layers of the plurality of pultruded members atop each other until the U-shaped receptacle is filled.

In another embodiment, the method may include securing each layer of pultruded members together via a clamp as the layer is dispensed from the pultruded member dispensing assembly.

In several embodiments, the method may include placing at least one fiber-reinforced polymer sheet atop the U-shaped receptacle containing the plurality of pultruded members, placing one or more pultruded plates atop the fiber-reinforced polymer sheet, and securing the plurality of pultruded members, the fiber-reinforced polymer sheet, and the one or more pultruded plates together via the resin infusion process to form the rotor blade component. In such embodiments, the method may also include placing at least one ultrasonic transducer atop the at least one fiber-reinforced polymer sheet to assist with packing the plurality of pultruded members within the U-shaped receptacle.

In further embodiments, the at least one roller may include a first roller mounted to an adjustable frame. In such embodiments, the method may include continuously adjusting a position of the first roller via the adjustable frame to vary an amount of pressure being applied to the heated flat sheet of material to shape the heated flat sheet of material into the desired shape. More specifically, in one embodiment, the method may include adjusting the position of the first roller via the adjustable frame in a vertical direction and/or a horizontal direction to modify a thickness or a width of the heated flat sheet of material. In addition, in certain embodiments, the step of shaping the heated flat sheet of material via at least one roller of the thermoforming system into the desired shape may include pivoting the first roller via the adjustable frame to shape the heated flat sheet of material.

In another aspect, the present disclosure is directed to a system for manufacturing a rotor blade component for a rotor blade. The system includes a housing having a first end and second end, at least one heating element at least partially contained within the housing, an adjustable frame secured within the housing, and at least one roller mounted to the adjustable frame. The first end of the housing is adapted to receive a flat sheet of material. Further, the heating element(s) is configured to heat the flat sheet of material as it passes through the housing. Moreover, the roller(s) is configured to continuously move in a plurality of directions via the adjustable frame to shape the heated flat sheet of material into a curved shape. In addition, the second end of the housing is adapted to dispense the curved shape to at least partially form the rotor blade component.

In one embodiment, the system may further include a curved support structure for supporting the flat sheet of material as the flat sheet of material is being heated via the heating element(s). Thus, in such embodiments, the curved support structure and the roller(s) are configured to shape the heated flat sheet of material into the curved shape.

In another embodiment, the adjustable frame is adapted to move up and down, side-to-side, and about at least one pivot point so as to move the roller(s) in a plurality of directions, thereby achieving the desired curved shape.

In further embodiments, the system may also include at least one movable pultruded member dispensing assembly for dispensing a plurality of members into the curved shape. For example, the pultruded member dispensing assembly may be removably mounted adjacent a first end of the curved shape, above the curved shape, or adjacent to the curved shape.

In additional embodiments, the system may include at least one clamp for securing individual layers of the plurality of pultruded members together as each layer is dispensed from the at least one pultruded member dispensing assembly. In several embodiments, the method may also include at least one spacer positioned within the curved shape for spacing apart the plurality of pultruded members as the members are dispensed from the at least one pultruded member dispensing assembly.

In particular embodiments, the system may further include a controller communicatively coupled to the movable pultruded member dispensing assembly and/or the adjustable frame such that the system can be controlled remotely and/or automatically.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
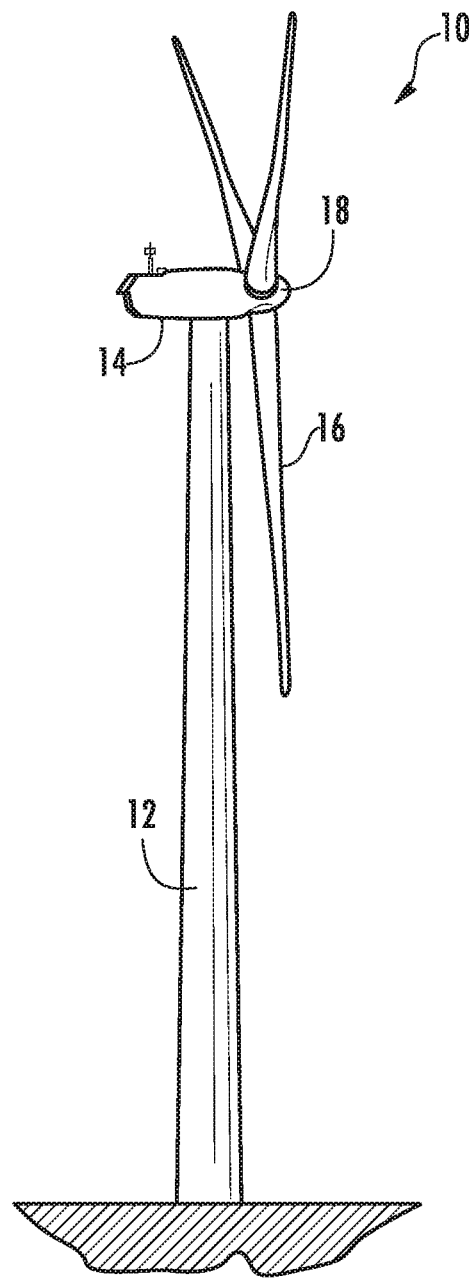
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of a horizontal axis wind turbine 10. It should be appreciated that the wind turbine 10 may also be a vertical-axis wind turbine. As shown in the illustrated embodiment, the wind turbine 10 includes a tower 12, a nacelle 14 mounted on the tower 12, and a rotor hub 18 that is coupled to the nacelle 14. The tower 12 may be fabricated from tubular steel or other suitable material. The rotor hub 18 includes one or more rotor blades 16 coupled to and extending radially outward from the hub 18. As shown, the rotor hub 18 includes three rotor blades 16. However, in an alternative embodiment, the rotor hub 18 may include more or less than three rotor blades 16. The rotor blades 16 rotate the rotor hub 18 to enable kinetic energy to be transferred from the wind into usable mechanical energy, and subsequently, electrical energy. Specifically, the hub 18 may be rotatably coupled to an electric generator (not illustrated) positioned within the nacelle 14 for production of electrical energy.

Figure 2:
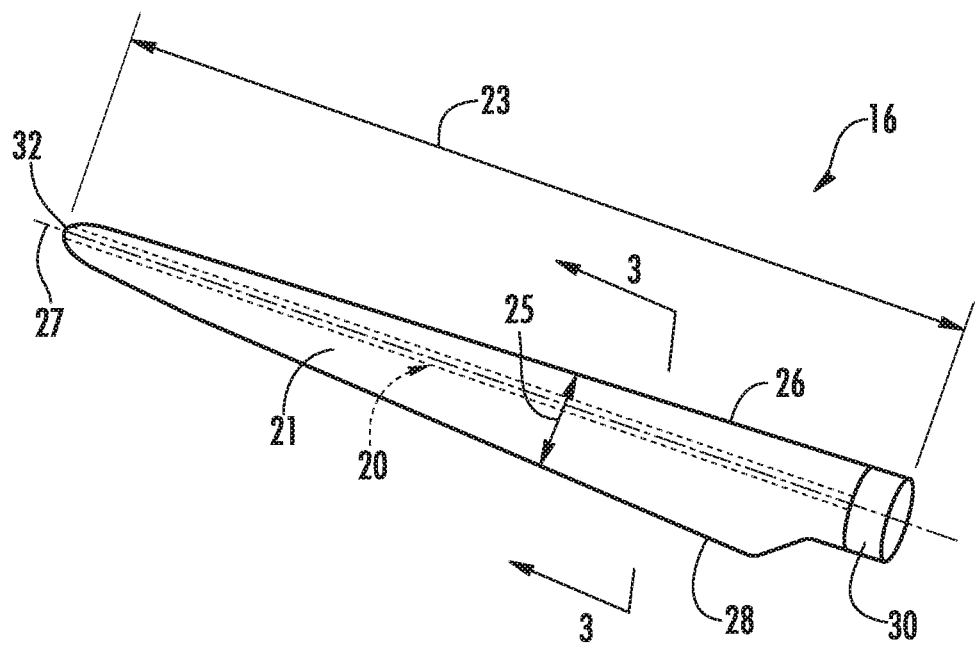
FIG. 2 illustrates a perspective view of one of the rotor blades of FIG. 1.
Figure 3:
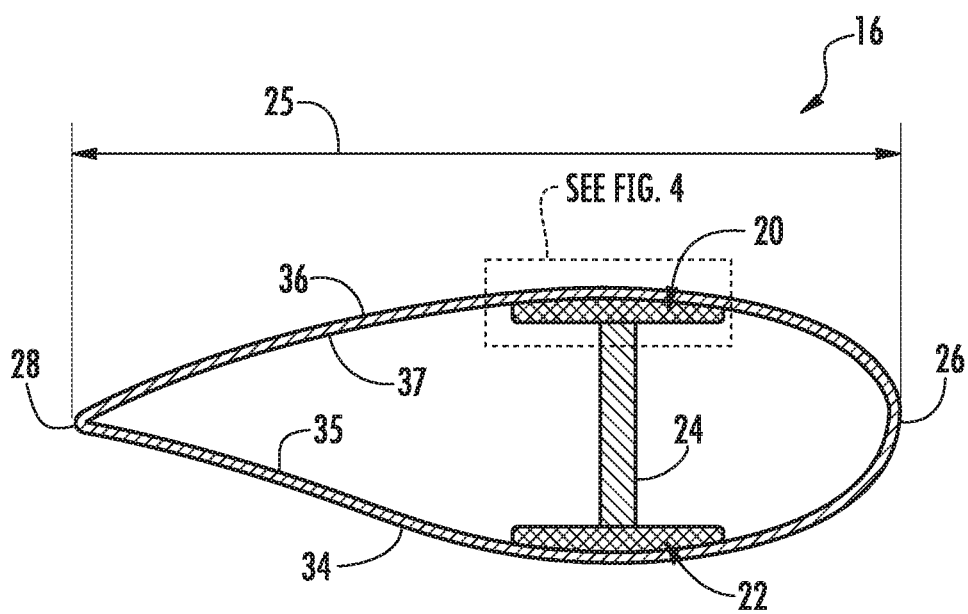
FIG. 3 illustrates a cross-sectional view of the rotor blade of FIG. 2 along line 3-3.

Referring to FIGS. 2 and 3, one of the rotor blades 16 of FIG. 1 is illustrated in accordance with aspects of the present subject matter. In particular, FIG. 2 illustrates a perspective view of the rotor blade 16, whereas FIG. 3 illustrates a cross-sectional view of the rotor blade 16 along the sectional line 3-3 shown in FIG. 2. As shown, the rotor blade 16 generally includes a blade root 30 configured to be mounted or otherwise secured to the hub 18 (FIG. 1) of the wind turbine 10 and a blade tip 32 disposed opposite the blade root 30. A body shell 21 of the rotor blade generally extends between the blade root 30 and the blade tip 32 along a longitudinal axis 27. The body shell 21 may generally serve as the outer casing/covering of the rotor blade 16 and may define a substantially aerodynamic profile, such as by defining a symmetrical or cambered airfoil-shaped cross-section. The body shell 21 may also define a pressure side 34 and a suction side 36 extending between leading and trailing ends 26, 28 of the rotor blade 16. Further, the rotor blade 16 may also have a span 23 defining the total length between the blade root 30 and the blade tip 32 and a chord 25 defining the total length between the leading edge 26 and the trialing edge 28. As is generally understood, the chord 25 may vary in length with respect to the span 23 as the rotor blade 16 extends from the blade root 30 to the blade tip 32.

In several embodiments, the body shell 21 of the rotor blade 16 may be formed as a single, unitary component. Alternatively, the body shell 21 may be formed from a plurality of shell components. For example, the body shell 21 may be manufactured from a first shell half generally defining the pressure side 34 of the rotor blade 16 and a second shell half generally defining the suction side 36 of the rotor blade 16, with such shell halves being secured to one another at the leading and trailing ends 26, 28 of the blade 16. Additionally, the body shell 21 may generally be formed from any suitable material. For instance, in one embodiment, the body shell 21 may be formed entirely from a laminate composite material, such as a carbon fiber reinforced laminate composite or a glass fiber reinforced laminate composite. Alternatively, one or more portions of the body shell 21 may be configured as a layered construction and may include a core material, formed from a lightweight material such as wood (e.g., balsa), foam (e.g., extruded polystyrene foam) or a combination of such materials, disposed between layers of laminate composite material.

Referring particularly to FIG. 3, the rotor blade 16 may also include one or more longitudinally extending structural components configured to provide increased stiffness, buckling resistance, and/or strength to the rotor blade 16. For example, the rotor blade 16 may include a pair of longitudinally extending spar caps 20, 22 configured to be engaged against the opposing inner surfaces 35, 37 of the pressure and suction sides 34, 36 of the rotor blade 16, respectively. Additionally, one or more shear webs 24 may be disposed between the spar caps 20, 22 so as to form a beam-like configuration. The spar caps 20, 22 may generally be designed to control the bending stresses and/or other loads acting on the rotor blade 16 in a generally span-wise direction (a direction parallel to the span 23 of the rotor blade 16) during operation of a wind turbine 10. Similarly, the spar caps 20, 22 may also be designed to withstand the span-wise compression occurring during operation of the wind turbine 10.

Figure 4:
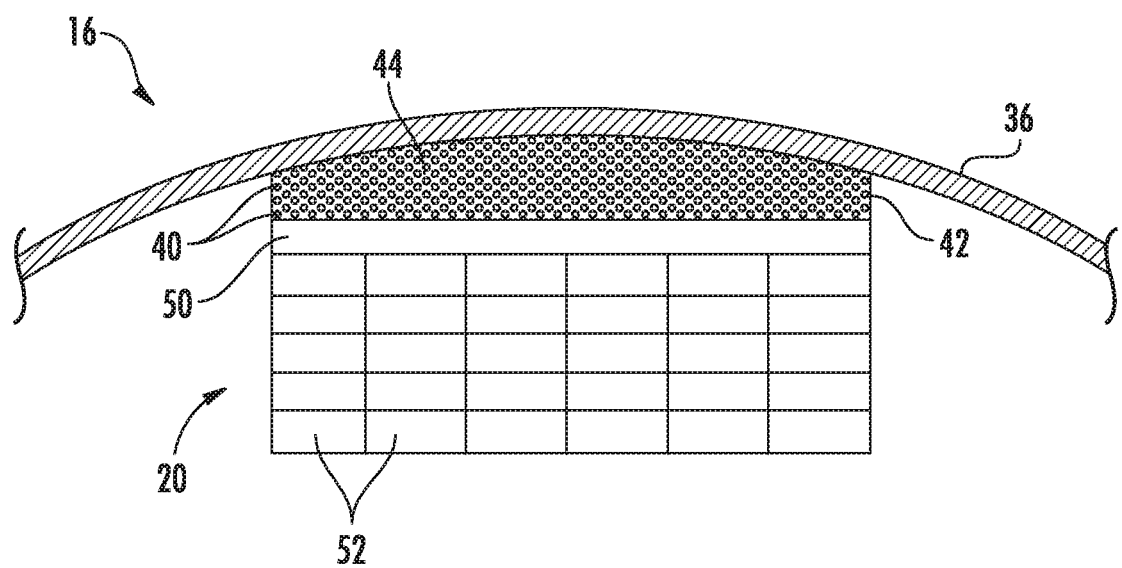
FIG. 4 illustrates a cross-sectional view of one embodiment of a spar cap formed using thermoforming and pultruded rods according to the present disclosure.
Figure 5:
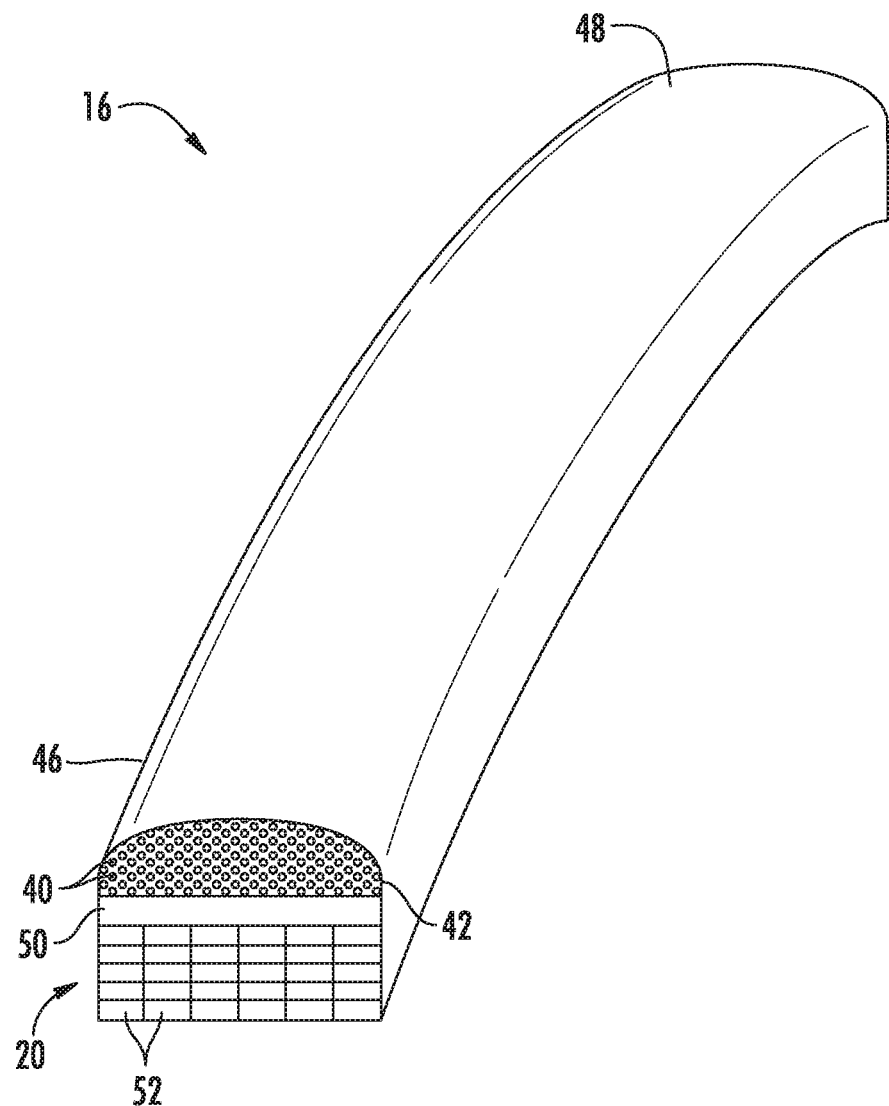
FIG. 5 illustrates a perspective, span-wise view of one embodiment of a spar cap formed using thermoforming and pultruded rods according to the present disclosure.

Referring now to FIGS. 4 and 5, various views of the spar cap 20 of FIG. 3 are illustrated. FIG. 4 illustrates, a detailed, cross-sectional view of the spar cap 20 of FIG. 3, whereas FIG. 5 illustrates a perspective view of the spar cap 20 of FIG. 3. More specifically, as shown, the spar cap 20 is constructed of a thermoformed receptacle 42 containing a plurality of pultruded members 40 (which can be pultruded rods or small plates) received therein. For example, as shown, the receptacle 42 may have a generally U-shaped cross-section such that the shape corresponds to the curvature of the suction side 36 (or pressure side 34) of the rotor blade 16. The plurality of pultruded rods 40 may also be sized to provide flexibility to the spar cap 20 such that the receptacle 42 can conform to the curvature of the rotor blade 16. In one embodiment, for example, the rods 40 may have a cross-sectional diameter of from about 0.25 millimeters (mm) to about 5 mm. Further, in one embodiment, the pultruded rods 40 may be secured within the receptacle 42 via a resin material 44 using an infusion process. Moreover, as shown, the spar cap 20 may also include an optional layer 50, such as a fiber-reinforced polymer layer 50, positioned adjacent to the receptacle 42.

In addition, as shown, the spar cap 20 may include a plurality of pultruded plates 52 stacked adjacent to the optional layer 50 and/or atop or within the pultruded-rod-filled receptacle 42. For example, as shown in FIG. 11(A), the receptacle 42 has side walls that receive the pultruded rods 40 therein. In further embodiments, as shown in FIG. 12, the receptacle 42 may have side walls that receive both the pultruded rods 40 and the pultruded plates 52. It should be understood that the plates 52 may be arranged in any number of layers with any number of plates 52 arranged in each layer. In addition, as shown in FIG. 5, the pultruded plates 52 may be curved to follow the curvature of the rotor blade 16. In alternative embodiments, the pultruded plates 52 may be rectangle and arranged in segments to follow the curvature of the rotor blade 16. Moreover, as shown, the spar cap 20 may extend between a first end 46 and a tip end 48 in a generally span-wise direction that corresponds to the root end 30 and the top end 32 of the rotor blade 16. Further, as shown, the spar cap 20 may be curved between the first and second ends 46, 48.

Figure 6:
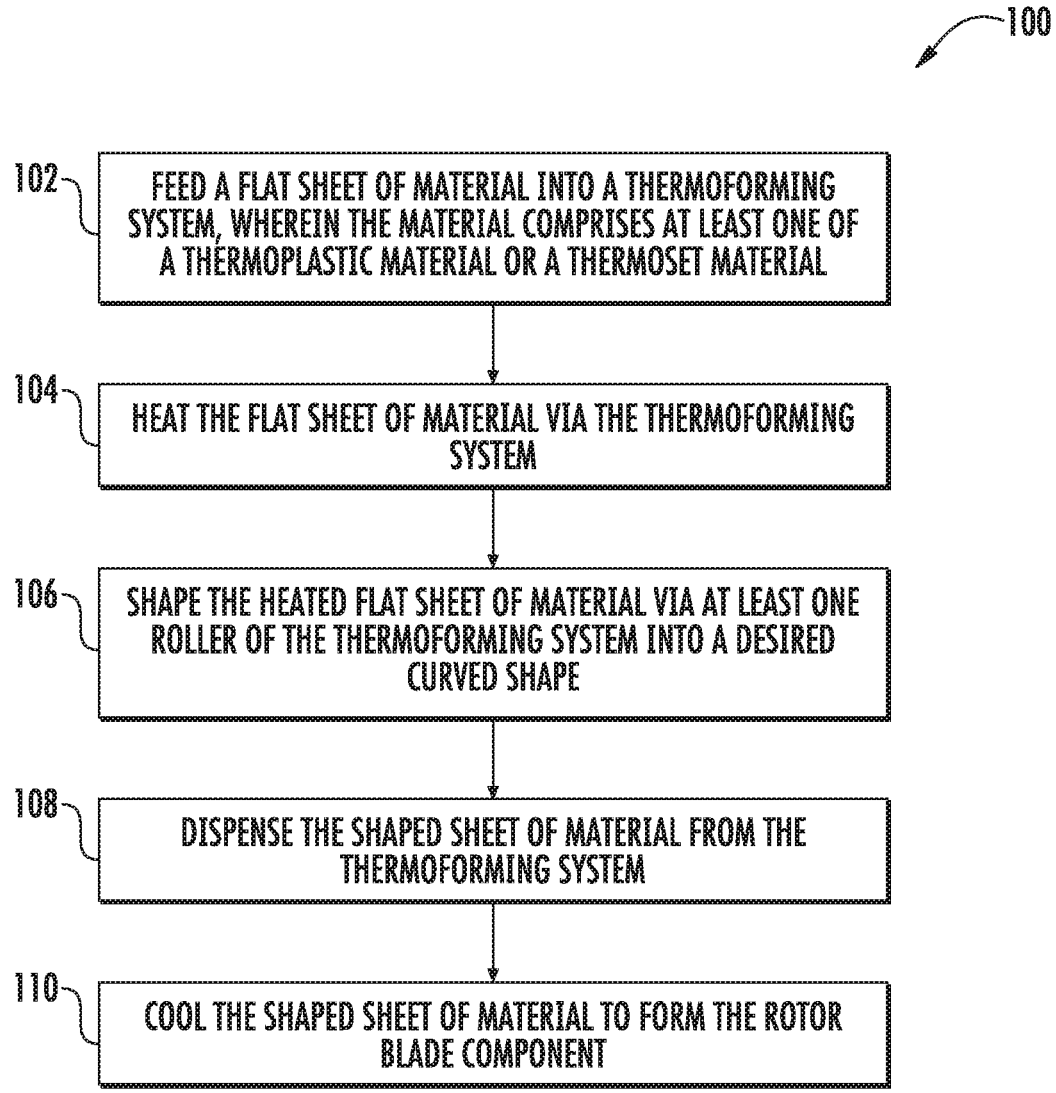
FIG. 6 illustrates a flow diagram of one embodiment of a method for manufacturing a rotor blade component, particularly a spar cap, according to the present disclosure.
Figure 7:
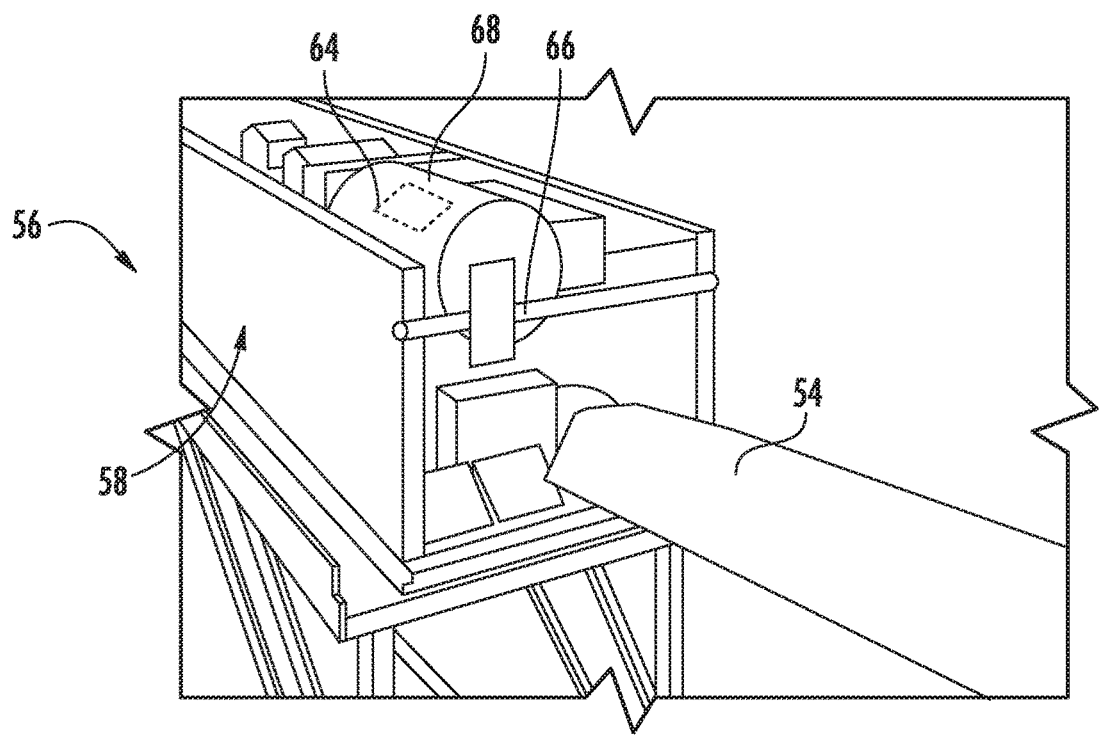
FIG. 7 illustrates a partial, perspective view of one embodiment of a front end of a thermoforming system for manufacturing a rotor blade component, particularly a spar cap, according to the present disclosure.
Figure 8:
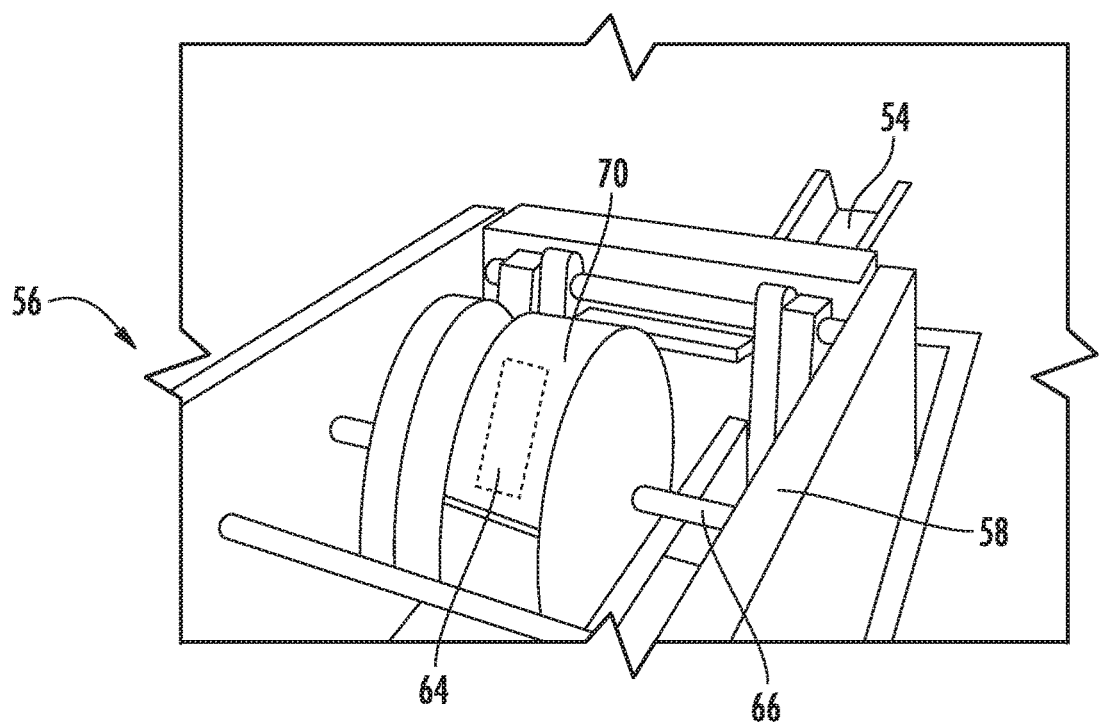
FIG. 8 illustrates a partial, perspective view of one embodiment of a rear end of a thermoforming system for manufacturing a rotor blade component, particularly a spar cap, according to the present disclosure.

Referring now to FIG. 6, a flow diagram of one embodiment of a method 100 for manufacturing a rotor blade component, such as the spar cap 20, of a rotor blade is illustrated. As shown at 102, the method 100 includes feeding a flat sheet of material 54 into a thermoforming system 56. More specifically, as shown in FIGS. 7 and 8, partial, perspective views of one embodiment of the thermoforming system 56 are illustrated. As shown, the thermoforming system 56 generally includes a housing 58 housing having a first end 60 and second end 62. Thus, as shown particularly in FIG. 7, the flat sheet of material 54 may be fed into the first end 60 of the thermoforming system 56.

Referring back to FIG. 6, as shown at 104, the method 100 includes heating the flat sheet of material 54 via the thermoforming system 56. For example, as shown in FIGS. 7 and 8, the system 56 may include at least one heating element 64 at least partially contained within the housing 58 for heating the flat sheet of material 54. The heating element(s) 64 described herein may include any suitable element such as, for example, a heater, a coil, or similar. Thus, the heating elements 64 are configured to heat the flat sheet of material 54 as it passes through the housing 58.

In addition, as shown, the thermoforming system 54 may include one or more rollers 68, 70 mounted or otherwise secured to an adjustable frame 66 within the housing 58. Moreover, as shown in FIGS. 7-10, the system 56 includes, at least, a first roller 68 and one or more second rollers 70 mounted to the adjustable frame 66. For example, as shown particularly in FIG. 10, a first stage of the system 56 may include the first roller 68 and a second stage of the system 56 may include a plurality of second rollers 70. Accordingly, as shown at 106 of FIG. 6, the method 100 also includes shaping the heated flat sheet of material 54 via the rollers 68, 70 into a desired curved shape. More specifically, in one embodiment, the rollers 68, 70 are configured to continuously move in a plurality of directions via the adjustable frame 66 to shape the heated flat sheet of material 54 into the curved shape.

Figure 9:
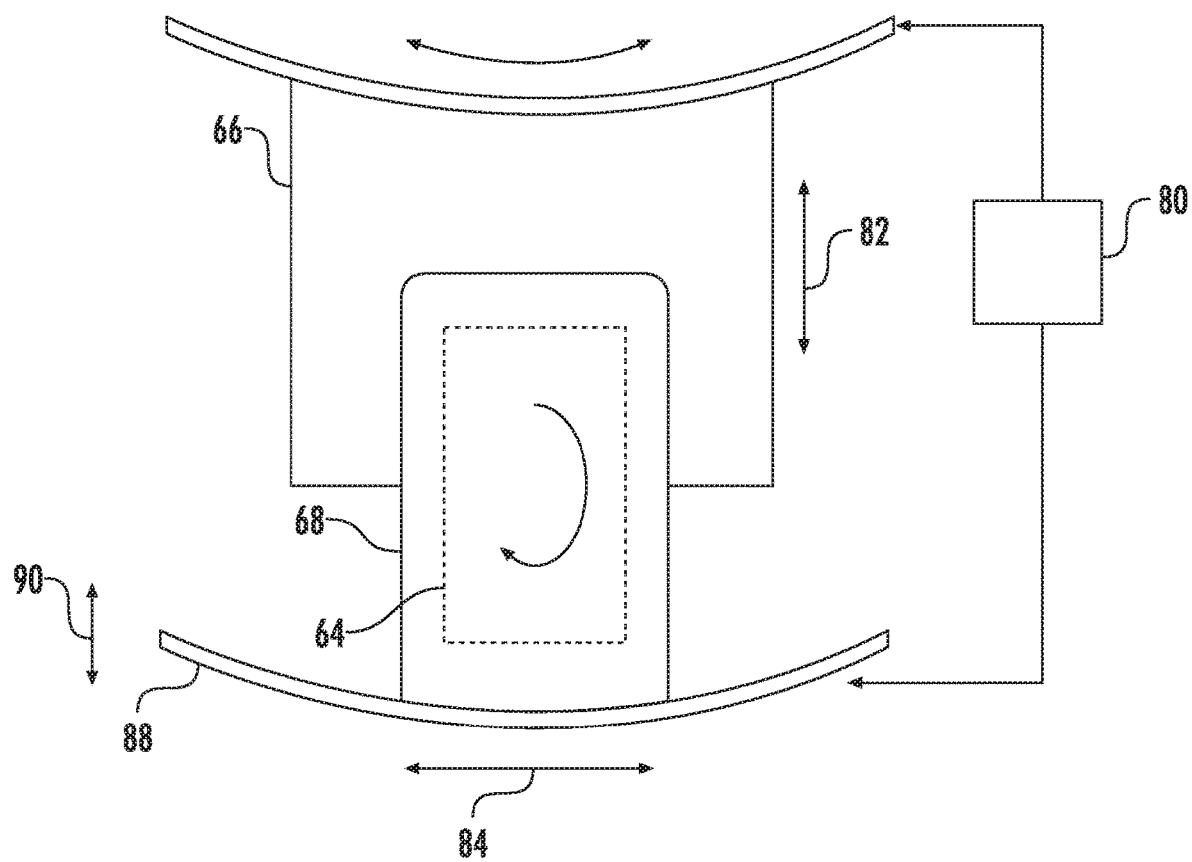
FIG. 9 illustrates a schematic diagram of one embodiment of a roller, adjustable frame, and support structure of a thermoforming system for manufacturing a rotor blade component, particularly a spar cap, according to the present disclosure.
Figure 10:
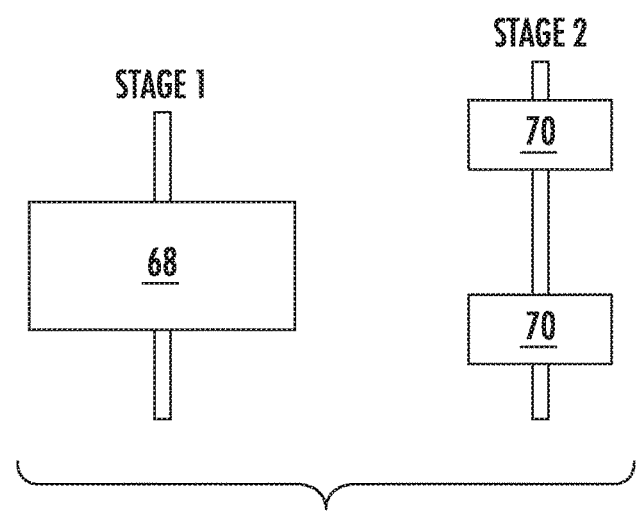
FIG. 10 illustrates a schematic diagram of one embodiment of various stages of rollers of a thermoforming system for manufacturing a rotor blade component, particularly a spar cap, according to the present disclosure.

For example, in various embodiments, the adjustable frame 66 may be adapted to move up and down, side-to-side, and about at least one pivot point so as to move the rollers 68, 70 in a plurality of directions, thereby achieving the desired curved shape. In such embodiments, the method 100 may include continuously adjusting a position of the rollers 68, 70 via the adjustable frame 66 to vary an amount of pressure being applied to the heated flat sheet of material 54 to shape the heated flat sheet of material into the desired shape. More specifically, as indicated in FIG. 9 by the various arrows, the method 100 may include adjusting the position of rollers 68, 70 via the adjustable frame 66 in a vertical direction 82 and/or a horizontal direction 84 to modify a thickness and/or a width of the heated flat sheet of material 54. In addition, as shown via arrow 86, the adjustable frame 66 may also be capable of rotating such as to pivot the rollers 68, 70 to further shape the heated flat sheet of material 54. Thus, in certain embodiments, the method 100 may include shaping the heated flat sheet of material 54 into the U-shaped receptacle 42 (FIGS. 4 and 5) via the rollers 68, 70.

Still referring to FIG. 9, the system 56 may further include a curved support structure 88 for supporting the flat sheet of material 54 as the sheet is being heated via the heating element(s) 64 and shaped by the rollers 68, 70. In alternative embodiments or in addition to the curved support structure 88, the system 56 may include one or more additional bottom and/or side rollers positioned below or to the side of the top roller(s) 68 for supporting the flat sheet of material 54 as the sheet is being heated via the heating element(s) 64 and shaped by the rollers 68, 70. Thus, in such embodiments, the curved support structure 88 and/or the roller(s) 68, 70 may be position-controlled to shape the heated flat sheet of material 54 into the curved shape. In addition, as shown by arrow 90, the support structure 88 and/or the rollers can be moved up and down and/or side to side.

Referring back to FIG. 6, as shown at 108, the method 100 includes dispensing the shaped sheet of material 54 from the thermoforming system. For example, as shown in FIG. 8, the second end 62 of the housing 58 is adapted to dispense the curved shape to at least partially form the spar cap 20 (i.e. to form the receptacle 42 that forms the portion of the component that abuts against the body shell 21). After dispensing, as shown at 110, the method 100 includes cooling the shaped sheet of material 54 to form the spar cap 20. The shaped material is further illustrated in step (A) of FIG. 11.

Figure 11:
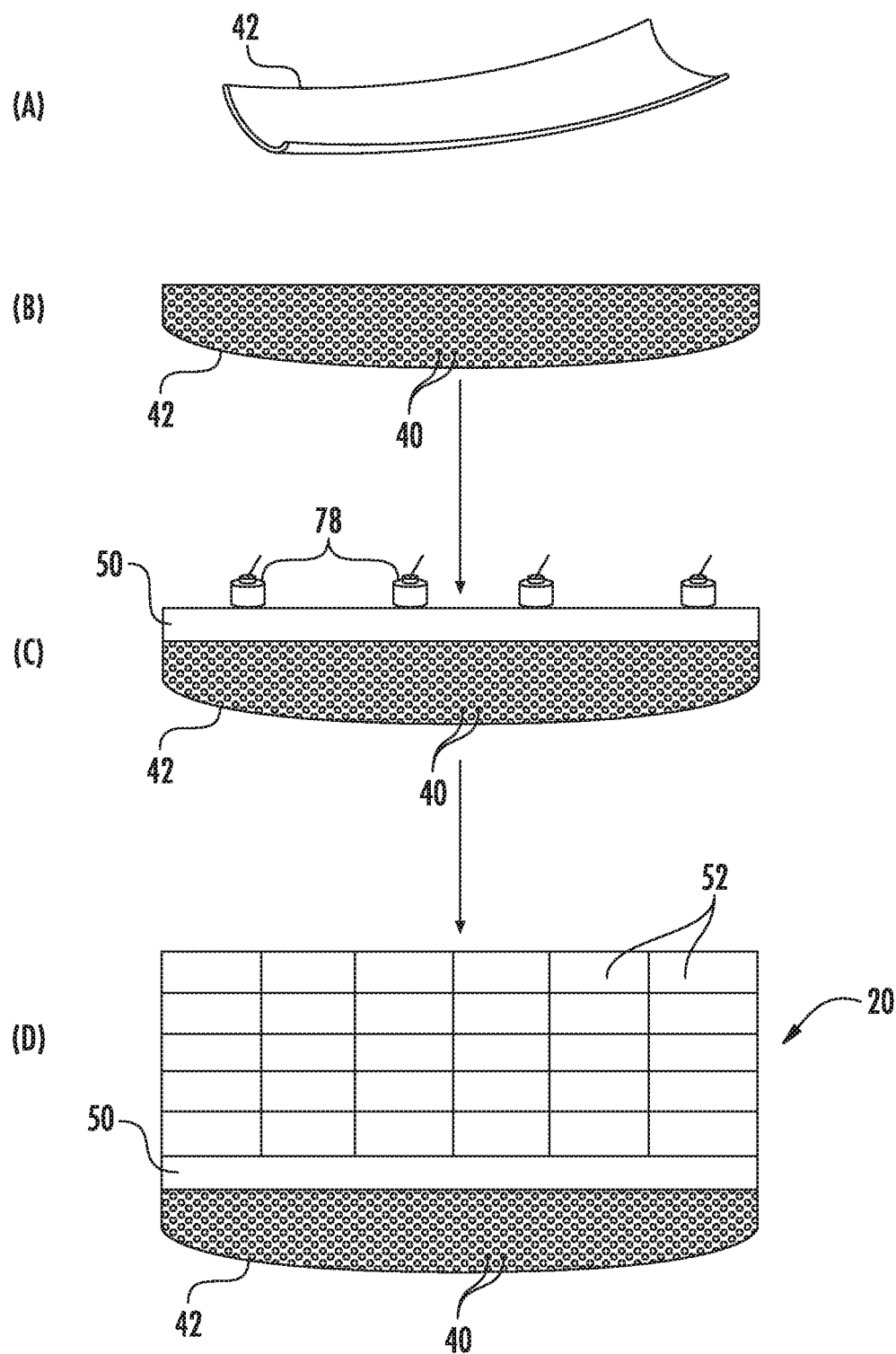
FIG. 11 illustrates a schematic diagram of one embodiment of a method for manufacturing a rotor blade component, particularly a spar cap, according to the present disclosure.
Figure 12:
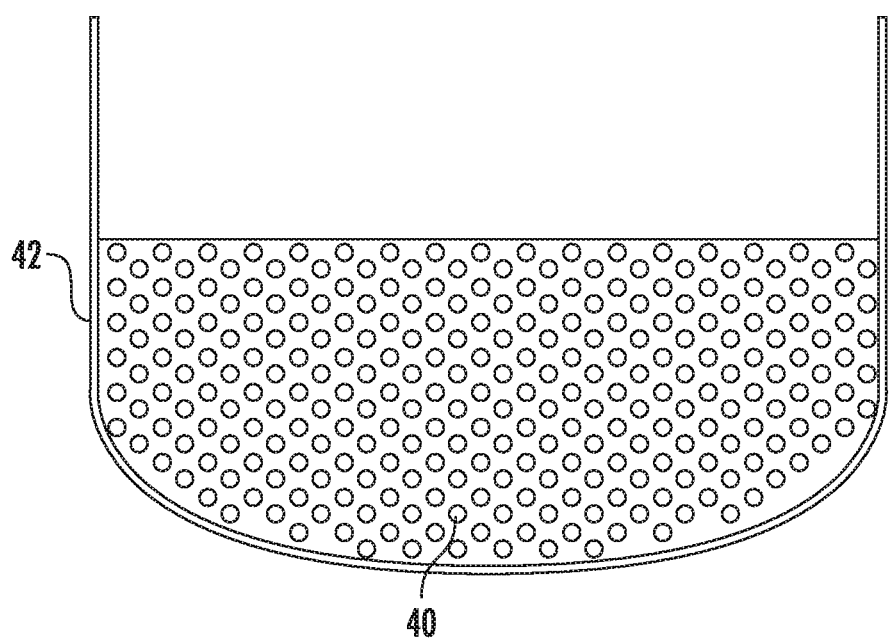
FIG. 12 illustrates a cross-sectional view of another embodiment of a spar cap formed using thermoforming and pultruded rods according to the present disclosure.
Figure 13:
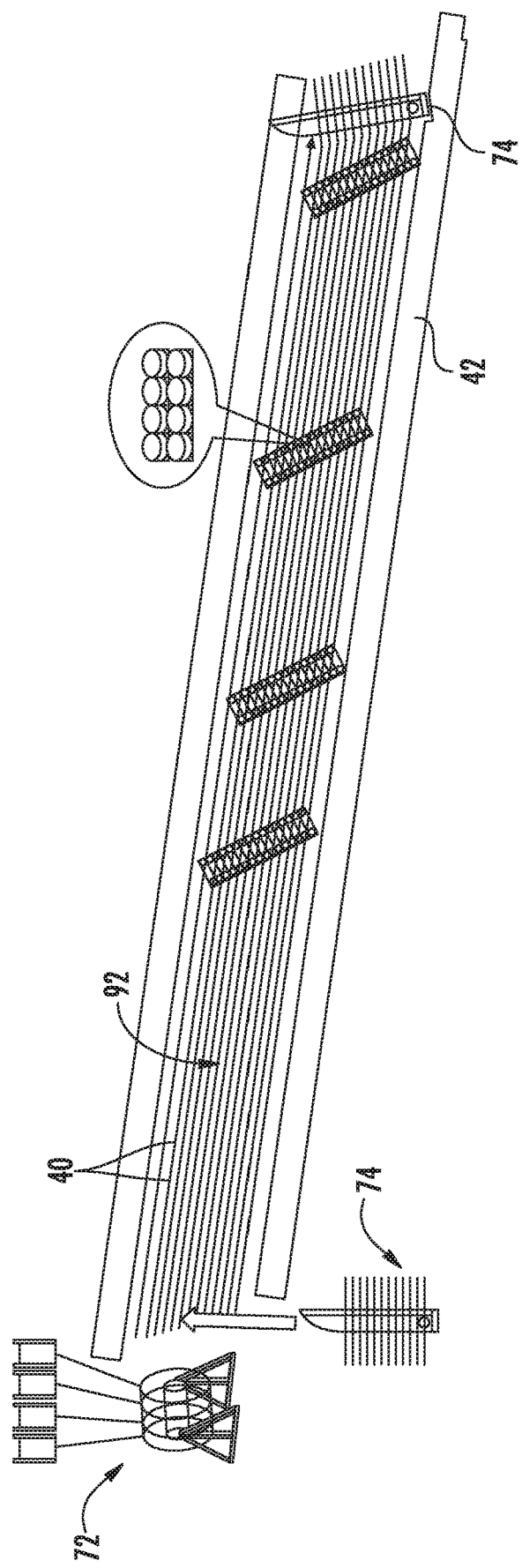
FIG. 13 illustrates a schematic diagram of one embodiment of a pultruded member dispensing assembly mounted at a first end of a receptacle that forms part of a rotor blade component, such as a spar cap, so as to dispense pultruded rods directly into the receptacle according to the present disclosure.
Figure 14:
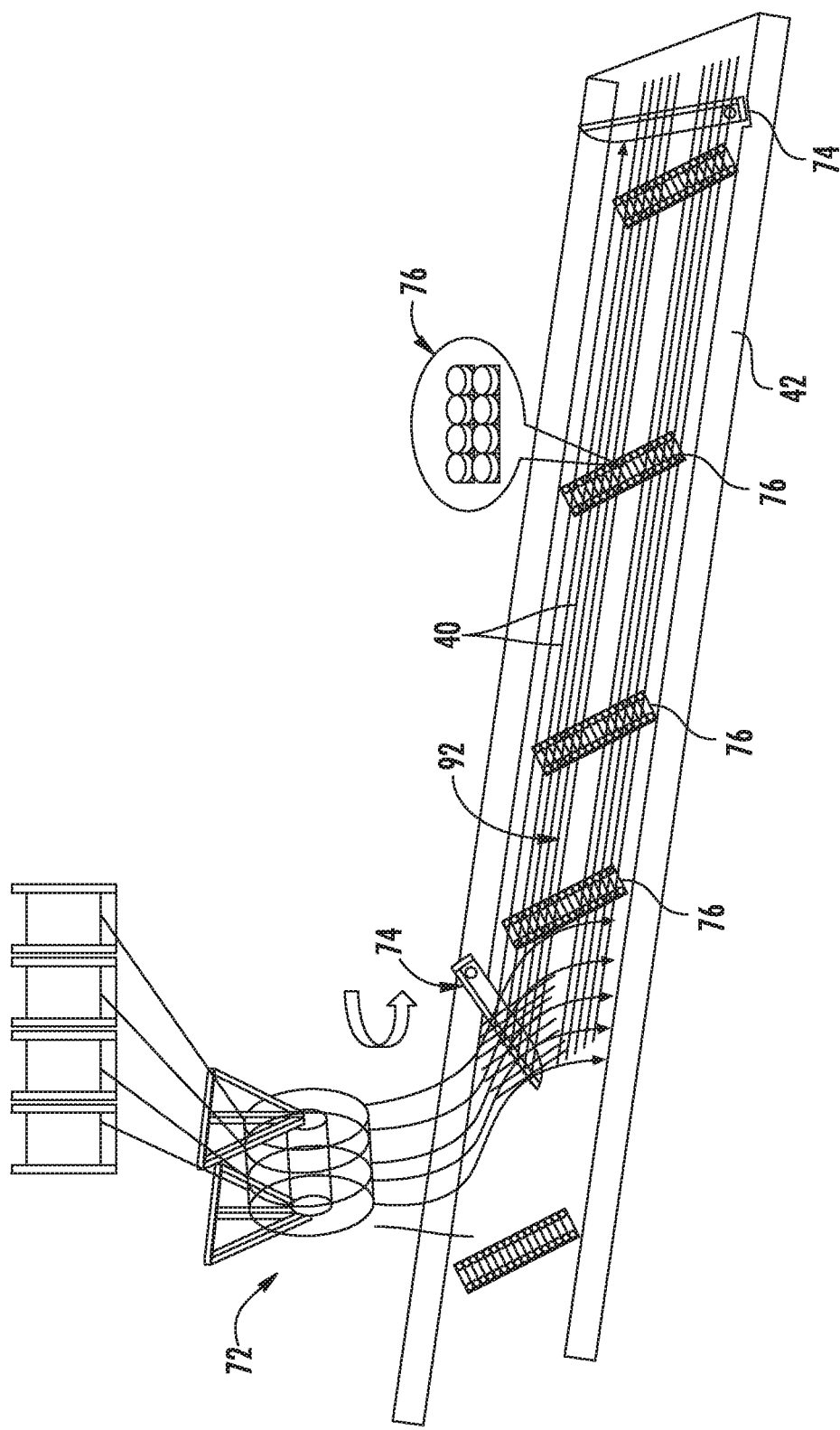
FIG. 14 illustrates a schematic diagram of one embodiment of a pultruded member dispensing assembly mounted above a receptacle that forms part of a rotor blade component, such as a spar cap, so as to dispense pultruded rods directly into the receptacle according to the present disclosure.

In further embodiments, as shown in FIG. 11 at step (B), the method 100 may further include placing a plurality of pultruded rods 40 into the receptacle 42 and securing the pultruded rods 40 therein. For example, in one embodiment, the pultruded rods 40 may be secured within the receptacle 42 via a resin infusion process. In particular embodiments, as shown in FIGS. 13 and 14, the pultruded rods 40 may be placed into the receptacle 42 by dispensing a layer 92 at a time of the pultruded rods 40 directly from a movable pultruded member dispensing assembly 72 into the receptacle 42 and stacking subsequent layers of the pultruded rods 40 atop each other until the receptacle 42 is filled. As such, the pultruded member dispensing assembly 72 may be removably mounted adjacent a first end of the receptacle 42 (FIG. 13), above the receptacle 42 (FIG. 14), or adjacent to the receptacle 42. Further, in certain embodiments, as shown in FIGS. 13 and 14, the method 100 may include securing each layer 92 of pultruded rods 40 together via at least one clamp 74 as each layer 92 is dispensed from the pultruded member dispensing assembly 72. The stacked layers can then be infused together via a resin infusion process. In addition, as shown, the method 100 may also include one or more spacers 76 positioned within the receptacle 42 for spacing apart the pultruded rods 40 as the rods 40 are dispensed from the pultruded member dispensing assembly 72.

In further embodiments, the system 56 may further include a controller 80 communicatively coupled to the movable pultruded member dispensing assembly 72 and/or the adjustable frame 66 (FIG. 9) such that the various components of the system 56 can be controlled remotely and/or automatically. As such, the controller 80 may include at least one processor having at least one computer. As used herein, the term computer is not limited to integrated circuits referred to in the art as a computer, but broadly refers to a processor, a microcontroller, a microcomputer, a programmable logic controller (PLC), an application specific integrated circuit, and other programmable circuits, and these terms are used interchangeably herein.

Referring particularly to step (C) of FIG. 11, once the curved portion of the spar cap 20 is formed via thermoforming system 56, the method 100 may further include placing at least one of the optional layers 50 described herein atop or adjacent to the pultruded-rod-filled receptacle 42. In such embodiments, as shown, the method 100 may also include placing at least one ultrasonic transducer 78 atop or adjacent to the optional layer(s) 50 to assist with packing the pultruded rods 40 within the receptacle 42. As shown at step (D), the method 100 may also include placing or stacking one or more pultruded plates 52 atop the optional layer 50 and securing the pultruded rods 40, the optional layer 50, and the pultruded plates 52 together via a resin infusion process to form the final spar cap 20.

The sheets of material and/or resins described herein may include a thermoplastic or thermoset material. A thermoplastic material generally encompasses a plastic material or polymer that is reversible in nature. For example, thermoplastic materials typically become pliable or moldable when heated to a certain temperature and solidify upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material.

Moreover, a thermoset material as described herein generally encompasses a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, esters, epoxies, or any other suitable thermoset material.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for manufacturing a rotor blade component of a rotor blade, the method comprising:
    feeding a flat sheet of material into a thermoforming system, wherein the material comprises at least one of a thermoplastic material or a thermoset material, the thermoforming system comprising a housing having an inlet and an outlet, one or more heating elements within the housing, an adjustable frame secured within the housing, at least one roller rotatably mounted to the adjustable frame within the housing, the adjustable frame being movable so as to adjust a position of the at least one roller in a horizontal direction, a vertical direction, and an annular direction, and a curved support structure for supporting the flat sheet of material as the flat sheet of material is heated via the least one heating element, the curved support structure and the least one roller configured to shape the flat sheet of material into a curved shape;
    heating the flat sheet of material via the one or more heating elements of the thermoforming system as the flat sheet of material passes through the housing;
    shaping the heated flat sheet of material into the curved shape via the curved support structure and the at least one roller by adjusting the position of the at least one roller in the horizontal direction, the vertical direction, and the annular direction and by pivoting the at least one roller via the adjustable frame by moving the adjustable frame up and down, side-to-side, and about at least one pivot point to cause the at least one roller to contact and form the heated flat sheet of material into the curved shape;
    dispensing the shaped sheet of material from the thermoforming system via the outlet; cooling the shaped sheet of material to at least partially form the rotor blade component; and
    dispensing a plurality of pultruded members directly from at least one movable pultruded member dispensing assembly into the shaped sheet of material.

2. The method of claim 1, wherein shaping the heated flat sheet of material into the desired curved shape further comprises shaping the heated flat sheet of material into a U-shaped receptacle via the curved support structure and the at least one roller.

3. The method of claim 2, wherein dispensing the plurality of pultruded members directly from the at least one movable pultruded member dispensing assembly into the shaped sheet of material further comprises placing the plurality of pultruded members into the U-shaped receptacle and securing the plurality of pultruded members within the U-shaped receptacle to form the rotor blade component.

4. The method of claim 3, wherein placing the plurality of pultruded members into the U-shaped receptacle further comprises:
    dispensing a layer at a time of the plurality of pultruded members directly from a pultruded member dispensing assembly into the U-shaped receptacle; and,
    stacking subsequent layers of the plurality of pultruded members atop each other until the U-shaped receptacle is filled.

5. The method of claim 4, further comprising securing each layer of pultruded members together via a clamp as the layer is dispensed from the pultruded member dispensing assembly.

6. The method of claim 3, further comprising securing the plurality of pultruded members within the U-shaped receptacle via a resin infusion process.

7. The method of claim 6, further comprising:
    placing at least one fiber-reinforced polymer sheet atop the U-shaped receptacle containing the plurality of pultruded members;
    placing one or more pultruded plates atop the fiber-reinforced polymer sheet; and
    securing the plurality of pultruded members, the fiber-reinforced polymer sheet, and the one or more pultruded plates together via the resin infusion process to form the rotor blade component.

8. The method of claim 6, further comprising placing at least one ultrasonic transducer atop the at least one fiber-reinforced polymer sheet to assist with packing the plurality of pultruded members within the U-shaped receptacle.

9. The method of claim 1, further comprising continuously adjusting a position of the at least one roller via the adjustable frame to vary an amount of pressure being applied to the heated flat sheet of material to shape the heated flat sheet of material into the desired shape.

10. The method of claim 9, further comprising adjusting the position of the at least one roller via the adjustable frame in at least one of a vertical direction or a horizontal direction to modify a thickness or a width of the heated flat sheet of material.

11. A thermoforming system for manufacturing a rotor blade component for a rotor blade, the thermoforming system comprising: a housing comprising a first end and second end and an inlet and outlet, the system also having one or more heating elements within the housing, an adjustable frame, a curved support structure, and at least one movable pultruded member dispensing assembly, the first end of the housing adapted to receive a flat sheet of material and the curved support structure adapted to support the flat sheet of material, the at least one heating element at least partially contained within the housing, the at least one heating element configured to heat the flat sheet of material, the adjustable frame secured within the housing and being adapted to move so as to adjust a position of at least one roller, rotatably mounted to the adjustable frame within the housing, in a horizontal direction, a vertical direction, and an annular direction, the curved support structure and the least one roller configured to shape the flat sheet of material into a curved shape by pivoting the at least one roller via the adjustable frame and by moving the adjustable frame up and down, side-to-side, and about at least one pivot point to cause the at least one roller to contact and form the heated flat sheet of material into the curved shape, and the at least one movable pultruded member dispensing assembly adapted to dispense a plurality of pultruded members directly into the curved shape.

12. The system of claim 11, further comprising at least one movable pultruded member dispensing assembly for dispensing a plurality of rods into the curved shape.

13. The system of claim 11, wherein the at least one pultruded member dispensing assembly is removably mounted adjacent to at least one of a first end of the curved shape, above the curved shape, or adjacent to the curved shape.

14. The system of claim 13, further comprising at least one clamp for securing individual layers of the plurality of pultruded rods together as each layer is dispensed from the at least one pultruded member dispensing assembly.

15. The system of claim 13, further comprising at least one spacer positioned within the curved shape for spacing apart the plurality of pultruded rods as the rods are dispensed from the at least one pultruded member dispensing assembly.

16. The system of claim 13, further comprising a controller communicatively coupled to at least one of the at least one movable pultruded member dispensing assembly or the adjustable frame.

17. The method of claim 1:
wherein shaping the heated flat sheet of material into the desired curved shape further comprises shaping the heated flat sheet of material into a U-shaped receptacle via the curved support structure and the at least one roller;
wherein dispensing the plurality of pultruded members directly from the at least one movable pultruded member dispensing assembly into the shaped sheet of material further comprises placing the plurality of pultruded members into the U-shaped receptacle and securing the plurality of pultruded members within the U-shaped receptacle to form the rotor blade component; and
the method further comprising securing the plurality of pultruded members within the U-shaped receptacle via a resin infusion process.

18. The method of claim 17, further comprising:
placing at least one fiber-reinforced polymer sheet atop the U-shaped receptacle containing the plurality of pultruded members;
placing one or more pultruded plates atop the fiber-reinforced polymer sheet; and
securing the plurality of pultruded members, the fiber-reinforced polymer sheet, and the one or more pultruded plates together via the resin infusion process to form the rotor blade component.

19. The method of claim 18, further comprising placing at least one ultrasonic transducer atop the at least one fiber-reinforced polymer sheet to assist with packing the plurality of pultruded members within the U-shaped receptacle.

* * * * *